(No Model.)
N. MERRILL.
PEDAL FOR VELOCIPEDES.
No. 351,880. Patented Nov. 2, 1886.
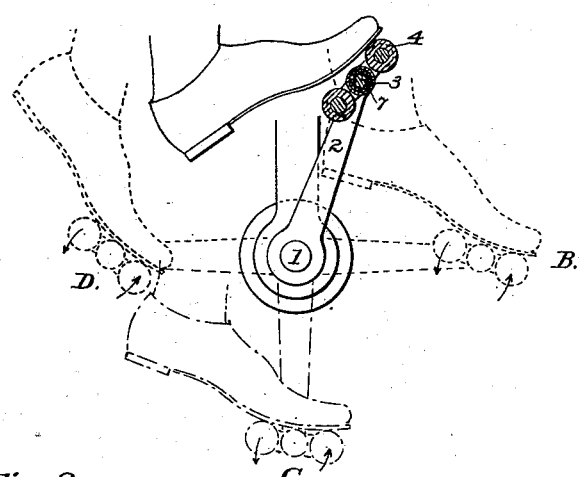
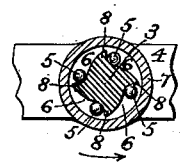
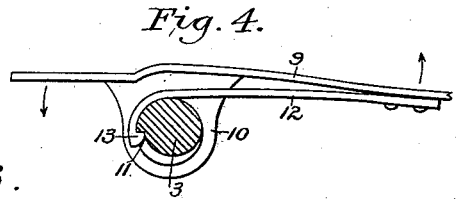
Attest:
A. N. Jesbera
J. A. Starr
Inventor:
Nelson Merrill
By David A. Burr
Atty.

UNITED STATES PATENT OFFICE.

NELSON MERRILL, OF NEW YORK, N. Y.

PEDAL FOR VELOCIPEDES.

SPECIFICATION forming part of Letters Patent No. 351,880, dated November 2, 1886.

Application filed July 29, 1886. Serial No. 209,357. (No model.)

*To all whom it may concern:*

Be it known that I, NELSON MERRILL, of the city, county, and State of New York, have invented a new and useful Improvement in the Pedal-Cranks for Velocipedes and other Purposes; and I do hereby declare that the following is a full and exact description thereof, reference being had to the accompanying drawings, and to the letters of reference marked thereon, making a part of this specification.

My invention relates to the pedal-cranks for velocipedes of all descriptions, and other foot-motors, and has for its object to increase the leverage of the crank without increasing the length of stroke or movement of the foot required to maintain it upon the crank, and to supply means whereby the length of this stroke or stretch of the foot may be lessened by the use of shorter cranks, affording greater ease to the rider than in the present construction of cranks and pedals without any loss of power.

It consists in combining with the crank of a velocipede or motor a pedal-lever pivoted upon the end of the pedal-crank, so as to be free to turn backward, but which may not turn forward thereon, whereby the length of the crank is increased by the length of the pedal or pedal-lever from its pivotal connection with the crank to its outer end during so much of the time of its revolution as the foot bears effectively thereon.

In the accompanying drawings, Figure 1 is a side elevation, partly in section, of one of the cranks of a bicycle having my invention applied thereto, Fig. 2 being a transverse section on an enlarged scale of the pivotal connection of the pedal with the crank. Fig. 3 is a side elevation, partly in section, of a bicycle-crank, illustrating a modification in the form of the pedal-lever and of its pivotal connection with the crank, Fig. 4 being a transverse section on an enlarged scale of the end of the crank with the pedal-lever pivoted thereto shown in elevation.

1 represents in said drawings the axle of the bicycle or velocipede of any description; 2, one of its crank-arms; 3, the crank or wrist-pin, and 4, Figs. 1 and 2, a foot-pedal of the form commonly used in bicycles and tricycles pivoted upon the wrist-pin. Instead, however, of connecting the foot-pedal 4 with the wrist-pin 3 by a simple pivotal connection, as has heretofore been done, whereby the pedal is left perfectly free to revolve loosely in either direction upon the wrist-pin, I interpose a restraining device in the pivotal joint, so as to leave the pedal free to turn in one direction only. Preferably I use friction-balls 5 5 for the purpose. The balls 5 5 are placed loosely in angular recesses 6 6, (see Fig. 2,) formed in the periphery of the wrist-pin 3 or in a collar fitted thereon under the encircling-sleeve 7, carrying the pedal, these recesses being created by means of a series of flat or slightly-curved faces on the periphery of the wrist-pin or collar at such an inclination as to leave at their inner ends an abrupt shoulder, 8, of a height slightly greater than the diameter of the ball to be confined in the recess. These balls so inclosed will permit a revolution of the pedal 4 about its axial wrist-pin 3 in the direction which will carry the ball against the shoulder 8 at the inner deeper end of the recess, but will prevent a reverse movement by reason of the wedging of the ball between the inclined bottom face of the recess and the inner periphery of the encircling sleeve, carrying the pedal, when it is moved in the opposite direction.

In the use of the pedal 4, thus fitted to the wrist-pin 3, the rider will, as in the revolution of the crank it approaches its highest position, by a slight movement of the ankle, (such as habitually occurs in walking as the body is thrown forward upon the foot which for the moment supports it,) bear upon the rear bar of the pedal upon which the foot rests, (see dotted lines D, Fig. 1,) and thereby turn it until the front bar of the pedal, which is under his toe, will be brought into a right line, or nearly so, with the arm 2 of the crank. (See positive lines, Fig. 1.) As the pedal cannot turn from the toe, but firmly engages the crank in that direction, it becomes in effect an extension of the crank, and the leverage of the rider's foot as he bears upon this outer front bar of the pedal is increased by the distance from the wrist-pin 3 to the point at which the toe bears upon the pedal. (See Fig. 1.) The increased leverage, due to this automatic increase in the length of the crank at the moment the crank is brought into position for an effective pressure thereon, continues effective until, as the foot begins to pass below the level of the axis of the crank, (see dotted lines at B in Fig. 1,) the pedal begins to turn. As the pedal will turn freely under the pressure of the foot upon the rear bar of the pedal while the crank is completing its revolution, the foot remains over the wrist-pin 3 when the latter reaches its lowest point, (see dotted lines at C, Fig. 1,) so that, notwithstanding the length of the crank is virtually increased at the moment it comes into effective play, the length of foot movement is in nowise extended.

In the modification of my invention illustrated in Figs. 3 and 4 an extended pedal, consisting of a plate of about the length of the foot, is pivoted by means of ears 10, projecting from the under side thereof a heel's length, or about two or three inches from its rear end to the wrist-pin 3 of the crank 2. One or more notches, 11, (see Fig. 4,) are formed in the periphery of the wrist-pin, and a plate-spring, 12, is made fast to the under side of the front end of the plate 9, to extend back thence over the wrist-pin 3, where it is bent and curved so as to bring its extremity into contact with the periphery of the wrist-pin, as shown in Fig. 4, and is provided with a terminal hook, 13, adapted to engage the notch or notches 11. The notch 11 is so formed and the hook 13 so bent that the hook will only engage the notch when the pedal-plate 9 is turned forward, leaving the pedal-plate free to turn uninterruptedly in the opposite direction, as shown by the arrows. The position of the notch 11 is so fixed in relation to the spring-hook as that the hook will engage the notch when the pedal is in a right line, or nearly so, with the crank-arm 2.

In the use of this extended pedal the leverage is very greatly increased, because of the increase of the distance between the wrist-pin at 3, and the point at which the rider's toe is brought to bear upon the pedal, as shown in positive lines in Fig. 3. The engagement of the hook 13 with the notch 11 serves to communicate the power exerted upon the end of the pedal to the crank-arm as effectively as if the two were integral, until when the rider's foot passes below the level of the crank-axle 1, (see dotted lines at B, Fig. 3,) and assumes a horizontal position, the hook 13 and notch 11 will in the revolution of the crank turn in opposite directions away from each other, as illustrated by the dotted lines at C and D in Fig. 3. When, however, the foot begins to rise above the level of the axle, as seen at D, Fig. 3, the rider by a natural movement of the ankle-joint will turn his toe upward, in readiness for a new thrust upon the crank, and in so doing will turn the pedal-plate into a right line or nearly so, with the crank-arm, in which position the spring-hook will again engage the notch on the wrist-pin, as hereinbefore described, and as illustrated in positive lines in Figs. 3 and 4.

I claim as my invention—

1. The combination, with the wrist-pin of a crank, of a pedal pivoted thereto with freedom to revolve thereon in one direction only, substantially in the manner and for the purpose herein set forth.

2. The combination, with the wrist-pin of a crank, of a pedal pivoted thereto to revolve thereon freely in one direction, and means, substantially as herein described, for automatically preventing its reverse movement.

3. The combination, with the wrist-pin of a crank, of an extended pedal-plate pivoted to the wrist-pin and a spring-actuated hook attached to the pedal to engage a notch in the periphery of the wrist-pin when it is rotated in one direction, and prevent thereby a reversal of its movement, substantially in the manner and for the purpose herein set forth.

In testimony whereof I have signed my name to this specification in the presence of two subscribing witnesses.

NELSON MERRILL.

Witnesses:
ARTHUR M. KEITH,
ADDIE K. MERRILL.